US011067151B2

(12) United States Patent
Palaspagar

(10) Patent No.: US 11,067,151 B2
(45) Date of Patent: Jul. 20, 2021

(54) PLANETARY GEARBOX

(71) Applicant: Sandeep Ramesh Palaspagar, Paras (IN)

(72) Inventor: Sandeep Ramesh Palaspagar, Paras (IN)

( * ) Notice: Subject to any disclaimer, the term of this patent is extended or adjusted under 35 U.S.C. 154(b) by 0 days.

(21) Appl. No.: 15/774,605

(22) PCT Filed: May 19, 2016

(86) PCT No.: PCT/IN2016/050148
§ 371 (c)(1),
(2) Date: May 9, 2018

(87) PCT Pub. No.: WO2017/115384
PCT Pub. Date: Jul. 6, 2017

(65) Prior Publication Data
US 2018/0320761 A1    Nov. 8, 2018

(30) Foreign Application Priority Data

Dec. 29, 2015 (IN) .......................... 4907/MUM/2015

(51) Int. Cl.
*F16H 3/66* (2006.01)
*F16H 1/46* (2006.01)
(Continued)

(52) U.S. Cl.
CPC ................. *F16H 3/66* (2013.01); *F16H 1/46* (2013.01); *F16H 3/721* (2013.01); *F16H 3/76* (2013.01); *F16H 2200/2007* (2013.01); *F16H 2200/2012* (2013.01); *F16H 2200/2035* (2013.01); *F16H 2200/2041* (2013.01)

(58) Field of Classification Search
CPC ..... F16H 2200/2007; F16H 2200/2012; F16H 2200/2035; F16H 2200/2041; F16H 2200/2043; F16H 3/66; F16H 3/721; F16H 3/76; F16H 1/46; F16H 57/082; F16H 57/087; F16H 57/10
See application file for complete search history.

(56) References Cited

U.S. PATENT DOCUMENTS 2,892,365 A * 6/1959 Winther .................. F16H 3/663
475/276
3,250,150 A * 5/1966 Stockton ................. F16H 47/08
475/56
(Continued)

FOREIGN PATENT DOCUMENTS

WO    WO-2012060667 A2 *   5/2012   ............. F16H 3/721

*Primary Examiner* — Charles A Fox
*Assistant Examiner* — Lori Wu

(57) ABSTRACT

A planetary gearbox comprises a driving shaft, a plurality of planetary gear train units (PGTUs), a carrier arm disc, a driven shaft and at least one brake assembly. Each of the PGTU further comprises a sun gear, at least one planet gear that is meshed to the sun gear and mounted on a planet axle, a ring gear that is meshed to the planet gear and at least one circular planet carrier arm (CPCA) that is coupled to the planet axle. The driving shaft of the planetary gearbox is coupled to the sun gear of the PGTU thereby causing the sun gear to rotate along with it. Further, the CPCA of the PGTU is coupled to the carrier arm disc and the carrier arm disc is further coupled to the driven shaft.

8 Claims, 8 Drawing Sheets

(51) Int. Cl.
*F16H 3/72* (2006.01)
*F16H 3/76* (2006.01)

(56) References Cited

U.S. PATENT DOCUMENTS

| | | | | |
|---|---|---|---|---|
| 5,509,865 | A * | 4/1996 | Hall, III | F16H 3/663 |
| | | | | 475/269 |
| 5,941,791 | A * | 8/1999 | Park | F16H 3/666 |
| | | | | 475/284 |
| 2006/0178243 | A1* | 8/2006 | Usoro | F16H 3/663 |
| | | | | 475/276 |
| 2013/0109525 | A1* | 5/2013 | Van Druten | B60K 6/365 |
| | | | | 475/5 |
| 2017/0203646 | A1* | 7/2017 | Mueller | F16H 3/728 |

* cited by examiner

US 11,067,151 B2

PLANETARY GEARBOX

FIELD OF INVENTION

The present invention relates to a planetary gearbox using planetary gear train units.

BACKGROUND OF INVENTION

In transmission system of an automobile vehicle, it is well known that a gearbox having parallel shafts and a single driven gear upon which complete load is distributed is used. This configuration poses numerous disadvantages, wherein gear cannot be shifted under load and large reductions are very hard to derive. Further, this configuration also results in wear and tear of gears which subsequently leads to grinding of gears. One of the most important disadvantage of parallel shaft gearbox is that, the frictional losses are high as compared to planetary or epicyclic gear train transmission.

OBJECT OF THE INVENTION

The principle object of the present invention is to provide a gearbox that will minimize the frictional losses. It is another object of the invention to provide a gearbox, wherein the gearbox enables shifting of gears under load and further reduces the wear and tear of gears while shifting and operation of the gears. It is another object of the invention to reduce load distribution on the single driven gear and to derive large reductions gear ratio.

SUMMARY OF INVENTION

The present invention discloses a gearbox comprising PGTUs (Planetary Gear Trains Units), wherein the sun gears of all the PGTUs are mounted on a driving shaft and CPCAs (Circular Planet Carrier Arms), also simply known as 'carrier arms', of each of the PGTUs in the gearbox are connected serially with axles on which planetary gears are mounted thereby coupling PGTUs between the CPCAs and forming a series of CPCAs which is further coupled to a carrier arm disc to the center of which the driven shaft is coupled. By stopping the motion of the ring gear, using a brake, of a PGTU through which the transmission is to be carried out while setting free the ring gears of rest of the PGTUs in the gearbox, the carrier arms along with driven shaft are allowed to rotate in same manner as that of the carrier arm of the PGTU whose ring gear is braked and through which transmission is being carried out when driving shaft is rotating.

In another embodiment, the gearbox is characterized with an additional PGTU that comprises one driving gear train and one driven gear train having their respective ring gears rigidly fixed to each other. Further, they are connected to a series of CPCAs, wherein the driven sun gear is fixed to a CPCA of the series of CPCAs. By stopping the revolutionary motion of planet gears, using a brake, of this additional PGTU through which the transmission is to be carried out while setting free the ring gears of the rest of the PGTUs in the gearbox, the carrier arms along with driven shaft are allowed to rotate in the same manner as that of the driven sun gear of the additional PGTU in which revolutionary motion of planet gears of both the gear trains are braked and through which transmission is carried out when driving shaft is rotating.

In another embodiment, the gearbox comprises an additional PGTU T3 that is characterized with a Socket plate and pins which can attach ring gear of driven gear train to driving sun gear directly. By stopping the revolutionary motion of the planet gear of the driven gear train and setting the revolutionary motion of the planet gear of the driving gear train, the reverse motion transmission is carried out when driving shaft is rotating and ring gears of the rest of the PGTUs are set free.

DETAILED DESCRIPTION OF PREFERRED EMBODIMENTS OF INVENTION

Figure 1:
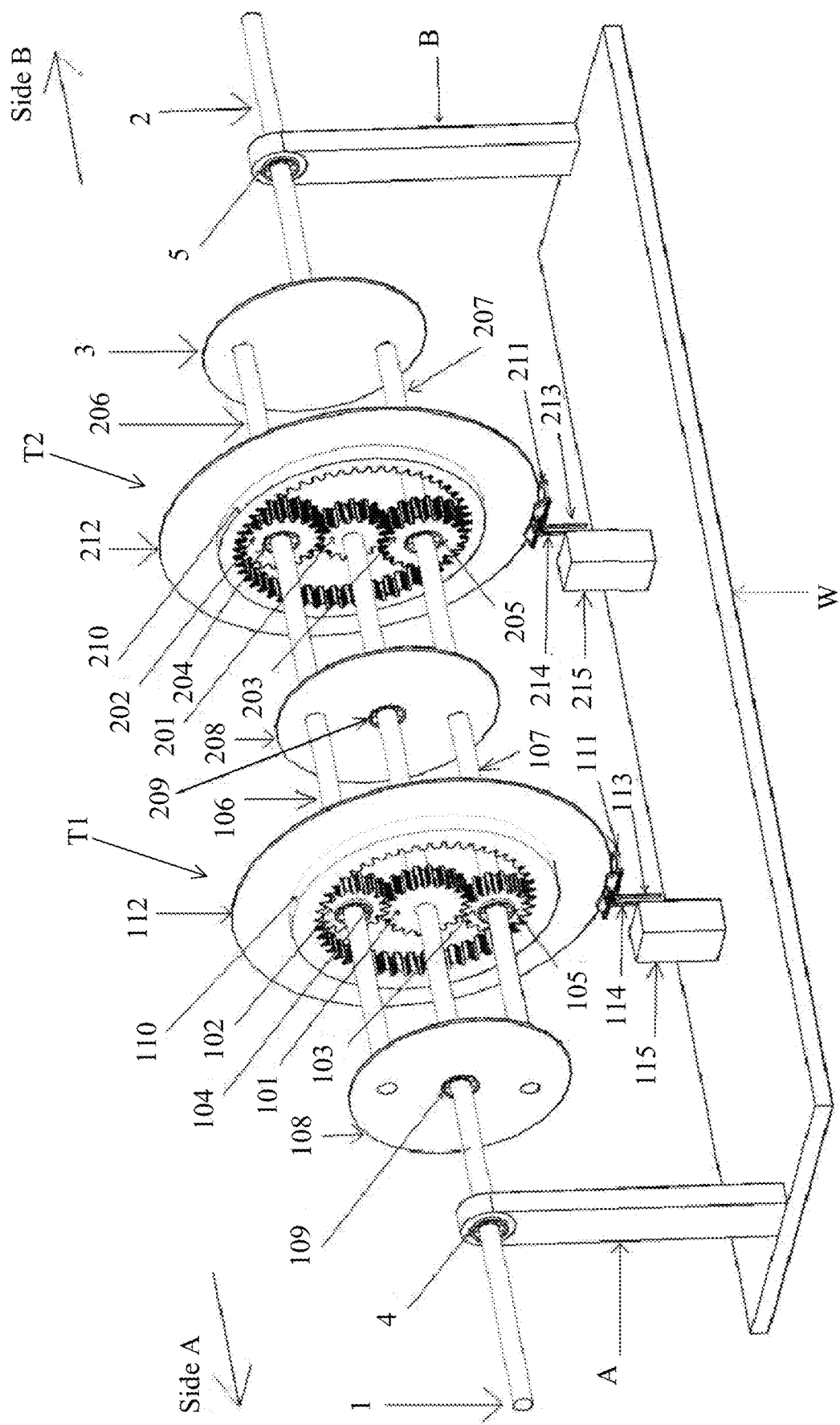
FIG. 1 shows a gearbox using planetary gear train units

Referring to the FIG. 1, a planetary gearbox comprises a driving shaft 1, a driven shaft 2, planetary gear train units T1 and T2, disc brakes 111 and 211 and a base W.

Shaft supports A and B with brake supports 115 and 215 stands on the base W, the side/end towards the direction of support A is termed as side A/end A and the side/end towards the direction of support B is termed as side B/end B.

PGTU T1 comprises a sun gear 101 mounted on driving shaft 1, planet gears 102 and 103 which are meshed with sun gear 101 and mounted on bearings 104 and 105 respectively which are further mounted on axles 106 and 107 respectively. Further, ends A of the axles 106 and 107 are fixed to side B of CPCA 108 and ends B of the axles 106 and 107 are fixed to the side A of CPCA 208. Finally, a ring gear 110 which is coaxial with sun gear 101 is meshed with planet gear 102 and 103.

PGTU T2 comprises a sun gear 201 mounted on driving shaft 1, planet gears 202 and 203 which are meshed with sun gear 201 and mounted on bearing 204 and 205 respectively which are further mounted on axles 206 and 207 respectively. Further, ends A of the axles 206 and 207 are fixed to side B of CPCA 208 and ends B of the axles 206 and 207 are fixed to the side A of carrier arm disc 3. Finally, a ring gear 210 which is coaxial with sun gear 201 and is meshed with planet gear 202 and 203.

Driven shaft 2 has its end A fixed to the center of the side B of carrier arm disc 3 and portion near end B mounted on support B with a second bearing 5. It is the output shaft of the gearbox.

Driving shaft 1 has its portion near end A mounted on support A with a first bearing 4. On the driving shaft 1, sun gears 101 and 201 are mounted. It is the input shaft of the gearbox.

Circular planet carrier arms (CPCAs) 108 and 208 are mounted on bearings 109 and 209 respectively which in turn are mounted on driving shaft 1.

Figure 2:
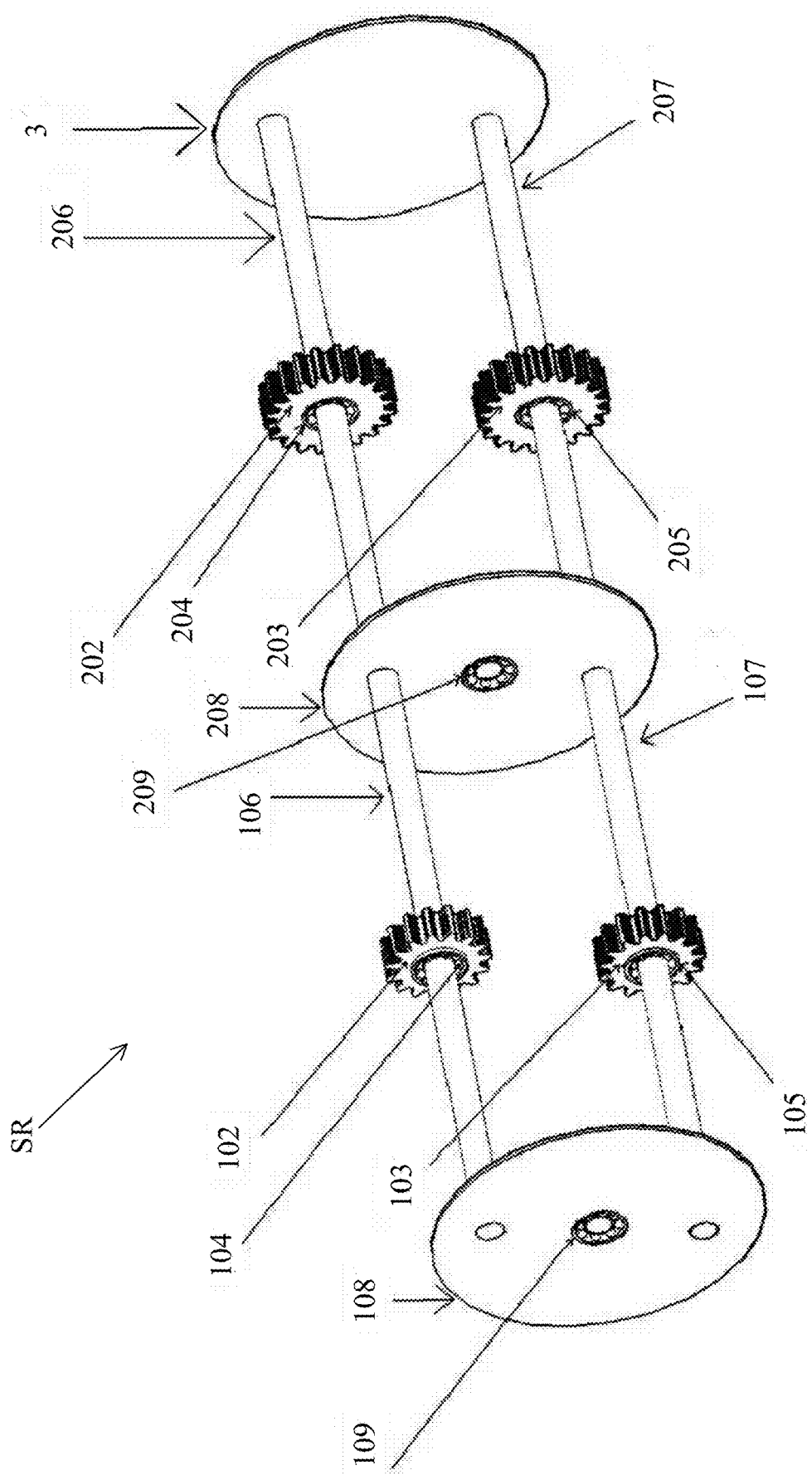
FIG. 2 shows a series SR of CPCAs (circular planetary carrier arms).

CPCA series SR as shown in FIG. 2 comprises CPCAs 108 and 208, carrier arm disc 3 and axles 106, 107, 206 and 207. CPCAs 108 and 208 are connected to each other with axles 106 and 107, wherein ends A of the axles 106 and 107 are fixed to side B of the CPCA 108 and ends B of the axles 106 and 107 are fixed to side A of the CPCA 208. Further, the CPCA 208 and the carrier arm disc 3 are connected to each other with axles 206 and 207, wherein ends A of the axles 206 and 207 are fixed to side B of the CPCA 208 and ends B of the axles 206 and 207 are fixed to side A of the carrier arm disc 3.

Figure 3:
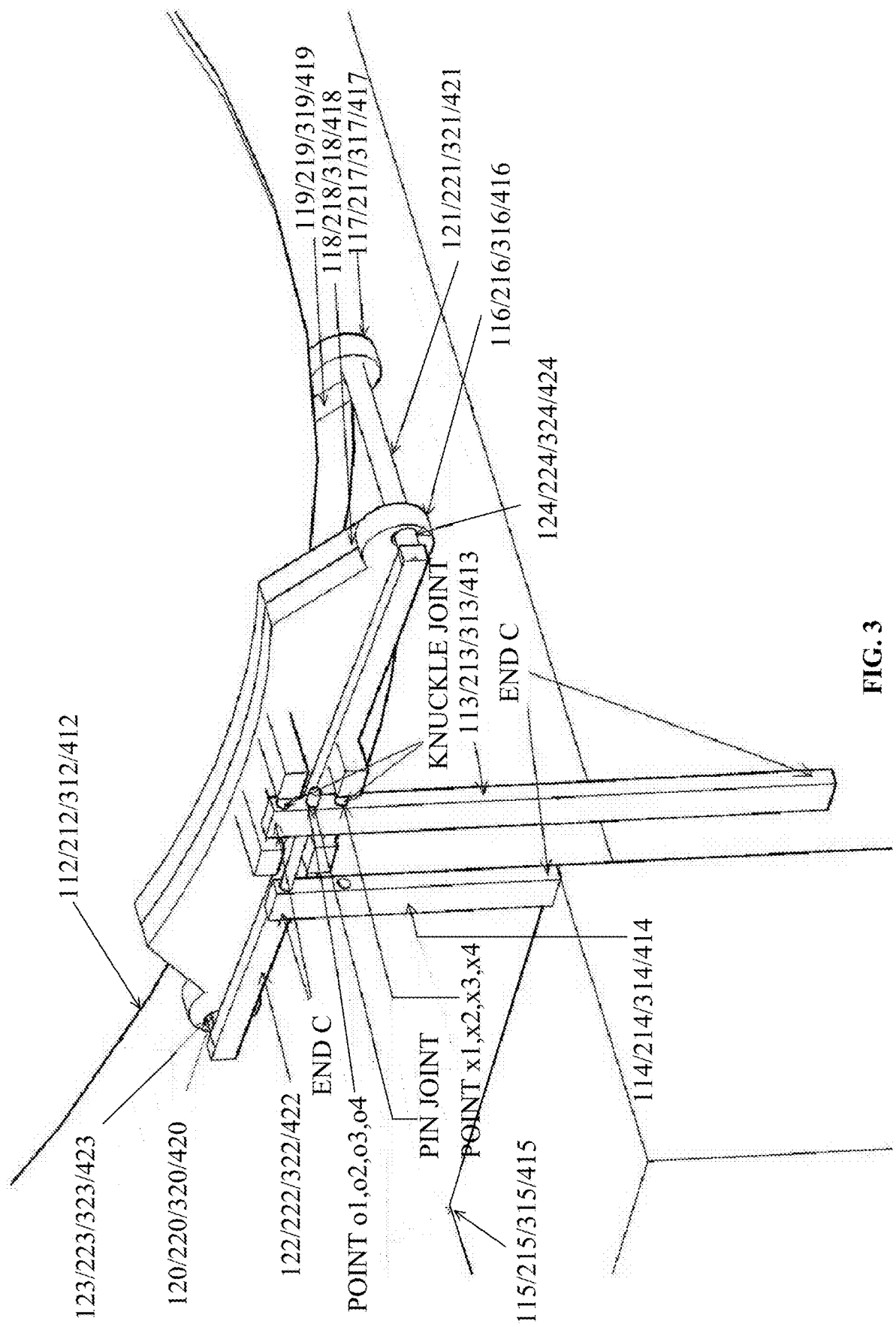
FIG. 3 shows a common diagram of brakes 111, 211, 311 and 411.

Disk brake 111 as shown in FIG. 3 comprises a rotor (brake disc) 112 mounted on ring gear 110, caliper sides 116 and 117 which holds brake pads 118 and 119 on the side A and B of the rotor (brake disc) 112 respectively, a bar 113 of which end C is fixed to the side A of caliper side 116 with a knuckle joint. Further, bar 113 is fixed at a point O1, via a pin joint, to a bar 114 and at point X1 with a knuckle joint, to guide pin (Slide pin) arm 122 of guide pins (Slide pins) 120 and 121 which are passed through ports/passage 123 and 124 respectively and are connected to the caliper side 117. Further, end D of the bar 113 is free to push or pull along the direction of support A and B and end D of the bar 114 is fixed to support 115.

Disk brake 211 as shown in FIG. 3, comprises a rotor (brake disc) 212 mounted on ring gear 210, caliper sides 216 and 217 which hold brake pads 218 and 219 on the side A and B of the rotor (brake disc) 212 respectively, a bar 213 of which end C is fixed to the side A of caliper side 216 with a knuckle joint. Further, bar 213 is fixed at a point O2, via a pin joint, to a bar 214 and at point X2 with a knuckle joint, to guide pin (Slide pin)arm 222 of guide pins (Slide pins) 220 and 221 which are passed through ports/passage 223 and 224 and are connected to the caliper side 217. Further, end D of the bar 213 is free to push or pull along its path through the direction of support A and B and end D of the bar 214 is fixed to support 215.

FIG. 1 shows a planetary gearbox, in first case when driven shaft 2 is set free of load the transmission is carried out through the PGTU T1. As driving shaft 1 rotates, sun gears 101 and 201 rotates along with the driving shaft 1 which further causes the planet gears meshed with each of them to revolve about their axes. The rotation of planet gears about their axes causes their corresponding ring gears 110 and 210 to rotate about their axes, simultaneously resulting in rotation of the circular carrier arms 108 and 208 along with carrier arm disc 3 and driven shaft 2 in same speed (rpm) that of driving shaft 1.

When brake rod 113 is pulled along its path from direction of support B to direction of support A then caliper side 116 and 117 presses the brake pads 118 and 119 against the rotor (brake disc) 112 thereby stopping the motion of rotor (brake disc) 112 and successively the motion of the ring gear 110 of PGTU T1. As driving shaft 1 rotates, sun gear 101 and 201 rotates along with the driving shaft 1 which tries to rotate the planet gears meshed with each of them about their axes along with the ring gear 110. Since the rotation of the ring gear 110 is arrested using the brake 111, the motion of sun gear 101 results in displacement of planet gears with their rotation about their corresponding own axes of rotation and simultaneously the planet gears revolve about sun gear 101, and at the same time ring gears of rest of the PGTUs in the gearbox are set free, and thus it allows rotation of all the CPCAs (circular planet carrier arms) and carrier arm disc 3 along with driven shaft 1 in same manner as that of the circular planet carrier arm 108 of PGTU T1. Therefore, the rest of the ring gears of the PGTUs rotate at a speed (rpm) resulted by the motion of corresponding sun gear, planet gear and Circular planet carrier arm. Hence, transmission is carried out through PGTU T1 when driving shaft 1 is rotating.

In second case, when the rotation of the driven shaft 2 is arrested by some load then the rotation of the carrier arm disc 3 along with the circular planet carrier arms 108 and 208 are also arrested. As driving shaft 1 rotates, sun gears 101 and 201 also rotates which in turn tries the planet gears meshed with them to revolve about them. Since the rotation of the CPCAs 108 and 208 are arrested, the rotation of the driving shaft 1 results in rotation of planet gears 103 and 104 about their corresponding own axes which further causes their corresponding ring gears 110 and 210 to rotate at a speed (rpm) resulted by the motion of corresponding sun gear and planet gear.

When brake rod 113 is pulled along its path from side B to side A then caliper sides 116 and 117 presses the brake pads against the rotor (brake disc) 112 arresting its motion and hence the motion of the ring gear 110 of PGTU T1 is also arrested. As in this case, the rotation of the CPCA 108 is already arrested therefore when the driving shaft 1 rotates, sun gear 101 also rotates which further tries to rotate the planet gears 103 and 104 about their own axis with the rotation of the corresponding ring gear 110. Since the rotation of the ring gear 110 is also arrested, the motion of sun gear 101 results in the displacement of planet gears 103 and 104 with their rotation about their own axis of rotation and simultaneously the revolution of planet gear about sun gear 101, and at the same time rest of the ring gears of the PGTUs in the gearbox are set free, and thus it allows rotation of all the CPCAs (circular planet carrier arms) and carrier arm disc 3 along with driven shaft 1 in same manner as that of the CPCA (circular planet carrier arms) 108 of PGTU T1. Therefore, the rest of the ring gears of the PGTUs rotates at a speed (rpm) resulted by the motion of corresponding sun gear, planet gear and Circular carrier arm.

Figure 4:
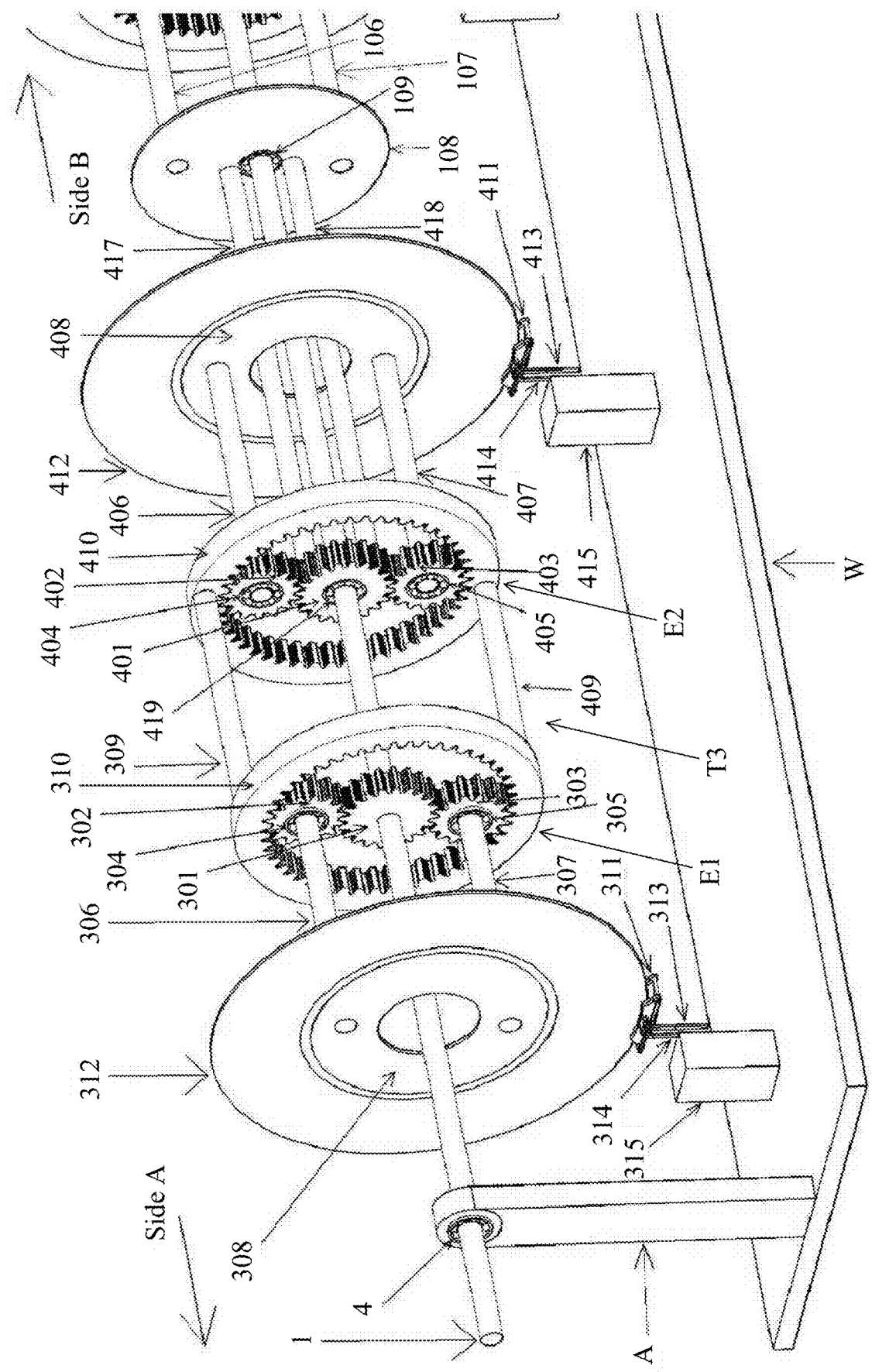
FIG. 4 shows a PGTU3 (Planetary gear train unit 3).
Figure 6:
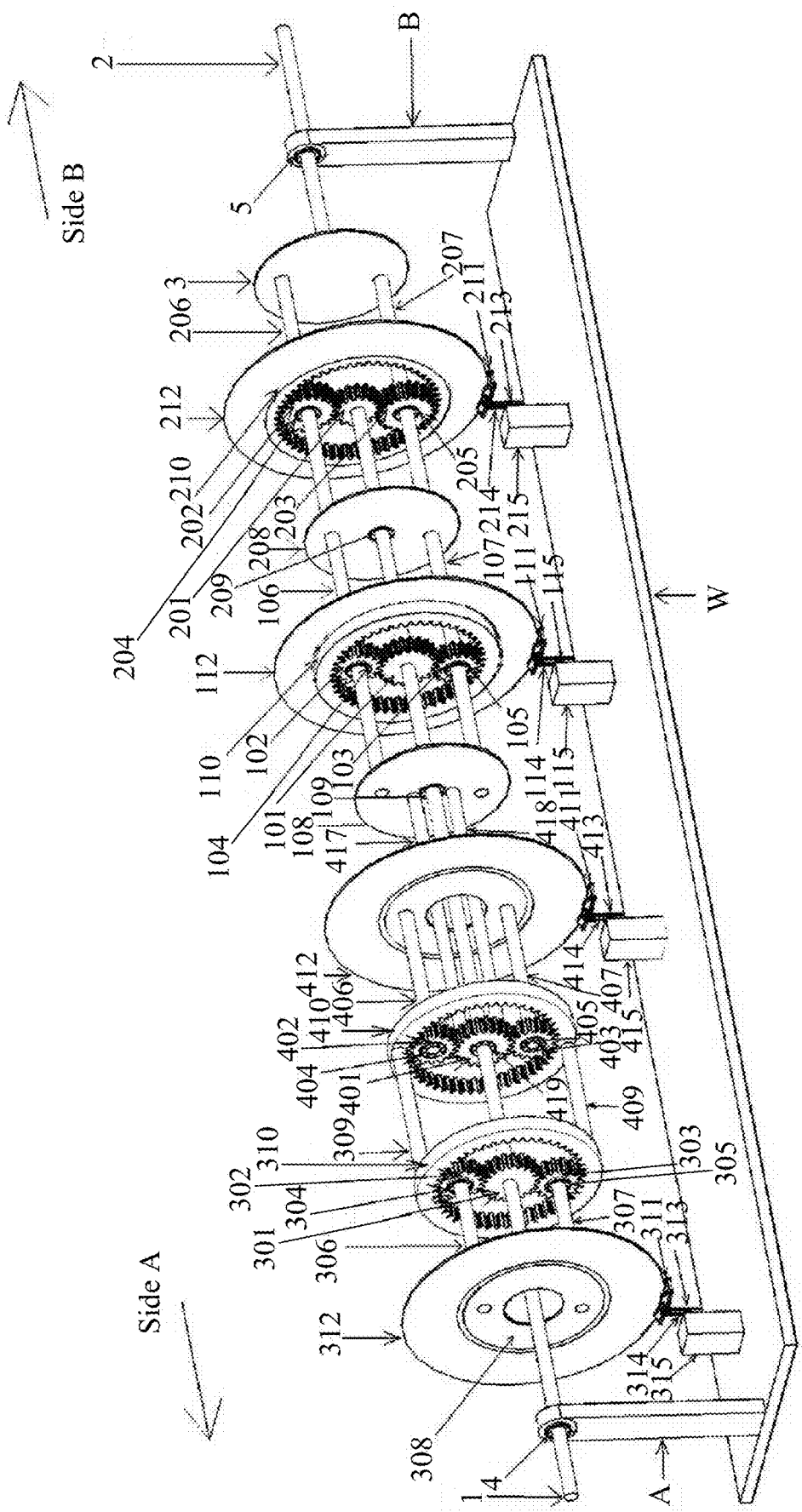
FIG. 6 shows a gearbox using planetary gear train units characterized with PGTU3.

FIGS. 4 and 6 illustrates alternate embodiments of the planetary gearbox. Referring to FIGS. 4 and 6, it can be seen that a planetary gearbox as described above is characterized with an additional PGTU T3, brakes 311 and 411, ring gears 310 and 410, rods 417 and 418. As shown in FIG. 4, the PGTU T3 comprises one driving planetary gear train unit E1 and one driven planetary gear train unit E2. The planetary gear train unit E1 further comprises a sun gear 301 mounted on the driving shaft 1, planet gears 302 and 303 mounted on bearing 304 and 305 respectively which are mounted on end B of axles 306 and 307 respectively. Further, end A of the axles 306 and 307 are fixed to side B of the CPCA 308 and ring gear 310 which is coaxial with sun gear 301 is meshed with planet gears 302 and 303. The planetary gear train unit E2 further comprises a sun gear 401 mounted on a bearing 419 which is mounted on driving shaft 1, planet gears 402 and 403 mounted on bearings 404 and 405 respectively which are mounted on end A of axles 406 and 407 respectively. Further, end B of the axles 406 and 407 are fixed to side A of the CPCA 408 and ring gear 410 which is coaxial with sun gear 401 is meshed with planet gears 402 and 403. The ring gear 310 is fixed rigidly to the ring gear 410 with rods 309 and 409 by connecting side A of the rods 309 and 409 to side B of the ring gear 310 and side B of the rods 309 and 409 to side A of ring gear 410.

Figure 5:
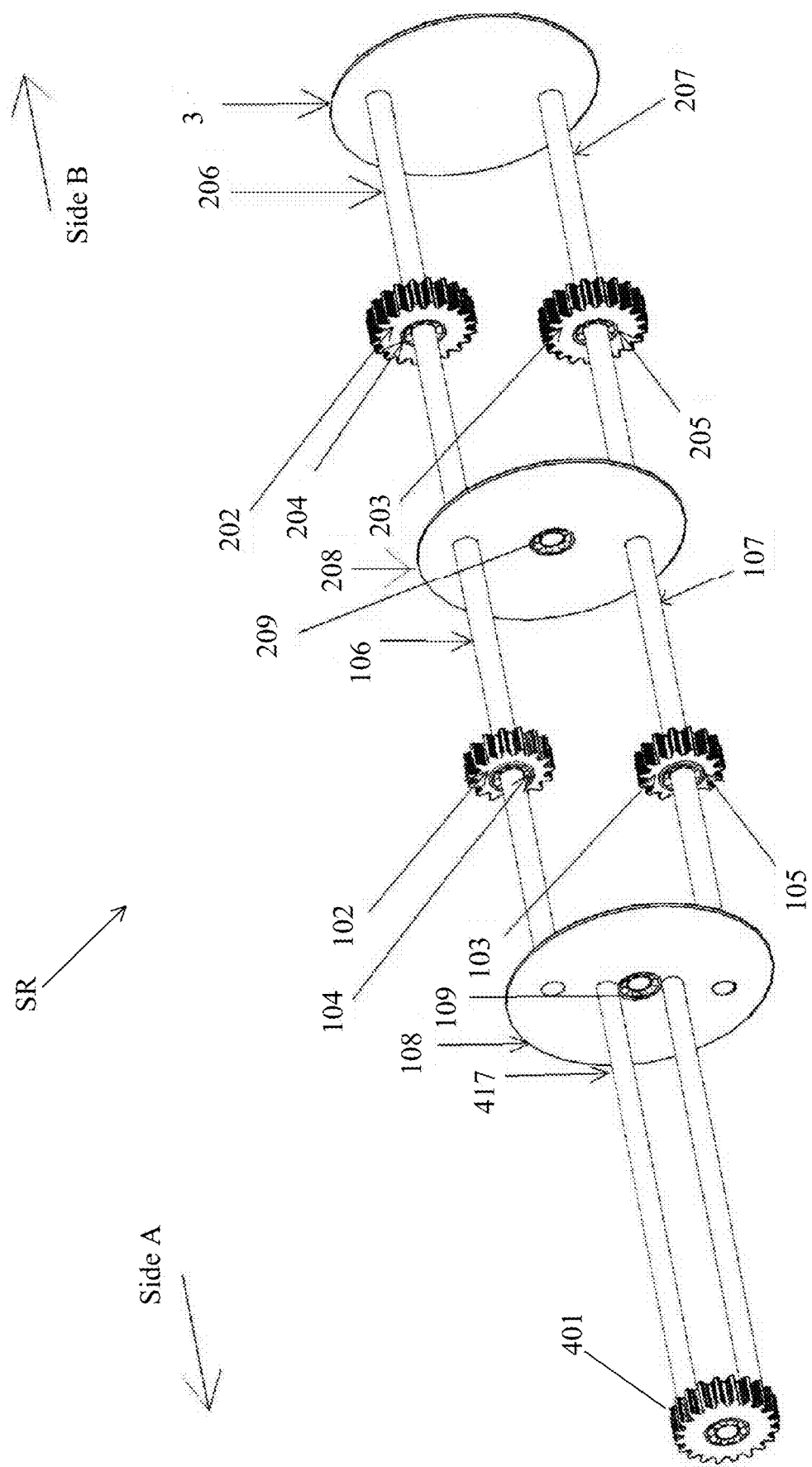
FIG. 5 shows a series SR1 of CPCAs (circular planetary carrier arms).

Referring to FIG. 5, PGTU T3 is connected to the CPCAs series SR by connecting end A of the rods 417 and 418 to side B of the sun gear 401 and end B of the rods 417 and 418 to side A of the CPCA 108 rigidly thereby making the sun gear 401 a part of the series SR.

Disk brake 311 comprises a rotor (brake disc) 312 mounted on CPCA 308, caliper sides 316 and 317 which hold brake pads 318 and 319 on both the side of the rotor (brake disc) 312, a bar 313 of which end C is fixed to the caliper side 316 via a knuckle joint. Further, the bar 313 is fixed at a point O3, via a pin joint, to the support 314 and at point X3 via a knuckle joint, to guide pin arm 322 of guide pins 320 and 321 which are passed through passage 223 and 224 and connected to the caliper side 317. Further, end D of the bar 313 is free to push or pull along the direction of support A and B.

Disk brake 411 comprises a rotor (brake disc) 412 mounted on CPCA 408, caliper sides 416 and 417 which hold brake pads 418 and 419 on both the side of the rotor (brake disc) 412, a bar 413 of which end C is fixed to the caliper side 416 via a knuckle joint. Further, the bar 413 is fixed at a point O4, via a pin joint, to the support 414 and at point X4, via a knuckle joint, to guide pin arm 422 of guide pins 420 and 421 which are passed through passage 423 and 424 and connected to the caliper side 417. Further, end D of the bar 413 is free to push or pull along its path through the direction of support A to B.

FIG. 6 shows planetary gearbox characterized with the additional PGTU T3. In first case, when driven shaft 2 is set free of load, the transmission is carried out through the PGTU T3. As the driving shaft 1 rotates, the sun gear 301 also rotates which causes the planet gears 302 and 303 meshed with them to revolve about it which further causes the corresponding ring gear 310 to rotate about its axis. Subsequently, the rotation of the ring gear 310 results in the rotation of the ring gear 410 about its axis as they are rigidly fixed to each other. Further, the rotation of the ring gear 410 causes the planet gears 402 and 403 meshed with it to revolve about the axis of rotation that of the ring gear 410 which further rotates sun gear 401 in the axis of rotation of the ring gear 410 and thereby resulting in rotation of the CPCAs series SR along with the carrier arm disc 3 and the driven shaft 2 in same speed (rpm) that of the driving shaft 1.

In second case, when the rotation of the driven shaft 2 is arrested by a load, consequently the motion of the carrier arm disc 3. CPCAs 108 and 208 and the sun gear 401 are also arrested. As the driving shaft 1 rotates, the sun gear 301 also rotates along with the driving shaft 1 which causes the planet gears 302 and 303 meshed with it to revolve about it which further causes the corresponding ring gear 310 to rotate about its axis. Subsequently, the rotation of the ring gear 310 results in the rotation of the ring gear 410 about its axis as they are rigidly fixed to each other. Further, the rotation of the ring gear 410 causes the planet gears 402 and 403 meshed with it to revolve about the axis of rotation that of the ring gear 410 which further tries to rotate the sun gear 401 in the axis of rotation of the ring gear 410. Since the rotation of the sun gear 401 is already arrested, the rotation of the ring gear 410 results in the displacement of the planet gears 402 and 403 meshed with the sun gear 401, wherein the planet gears 402 and 403 rotate about their own axes of rotation and also revolve about the sun gear 401, which causes the CPCAs 308 and 408 to rotate at a speed resulted by the motion of corresponding sun gears and planet gears.

When the brake bars 313 and 413 are pulled along their paths from direction of support B towards the direction of support A, caliper sides of each of the brakes presses the respective brake pads against the sides of the rotor (brake disc) 312 and 412 respectively. Therefore, the rotation of rotors 312 and 412 are arrested and consequently the motion of the CPCAs 308 and 408 of PGTU T3 are also arrested. As driving shaft 1 rotates, the sun gear 301 also rotates along with it which tries the planet gears 302 and 303 meshed with it to revolve about it. Since the rotation of the CPCA 308 is already arrested, the motion of the sun gear 301 results in rotation of the planet gears 302 and 303 meshed with it about their own axis of rotation in a direction opposite to that of the direction of motion of the sun gear 301 which further causes the ring gear 310 to rotate in a direction opposite to that of the direction of motion of the sun gear 301. Subsequently, the rotation of the ring gear 310 causes the ring gear 410 to rotate in a direction opposite to that of motion of the sun gear 301 and along the axis of rotation that of 310 as they are rigidly fixed to each other. Further, the rotation of the ring gear 410 tries to cause the planet gears 402 and 403 meshed with the ring gear 410 to revolve about the axis of rotation of the ring gear 410 but since the rotation of the CPCA 408 is already arrested, the motion of the ring gear 410 results in rotation of the planet gears 402 and 403 meshed with it about their own axes of rotation in same the direction as that of motion of the ring gear 410. This rotation of the ring gear 410 causes the sun gear 401 to rotate in the same direction as that of motion of the sun gear 30. Now since rest of the ring gears of the PGTUs in the gearbox are set free, the circular carrier arms and carrier arm disc 3 along with driven shaft 2 rotate in same manner as that of the sun gear 401 of PGTU T3 and further rest of the ring gears of the PGTUs rotate at a speed (rpm) resulted by the motion of corresponding sun gear, planet gear and Circular carrier arm. In this way, the transmission is carried out through PGTU T3 when driving shaft 1 is rotating.

Figure 7:
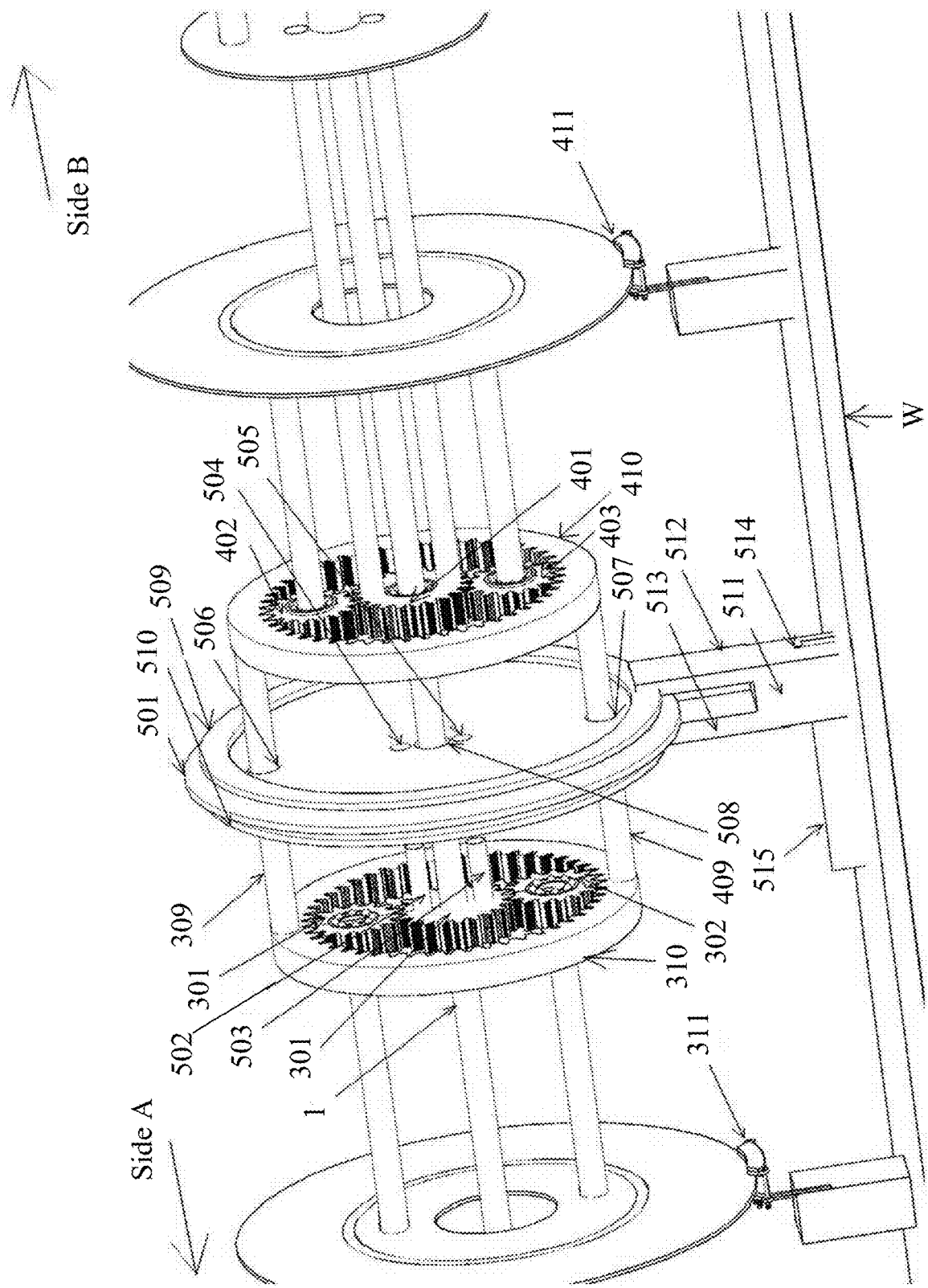
FIG. 7 shows a circular socket arm mechanism.
Figure 8:
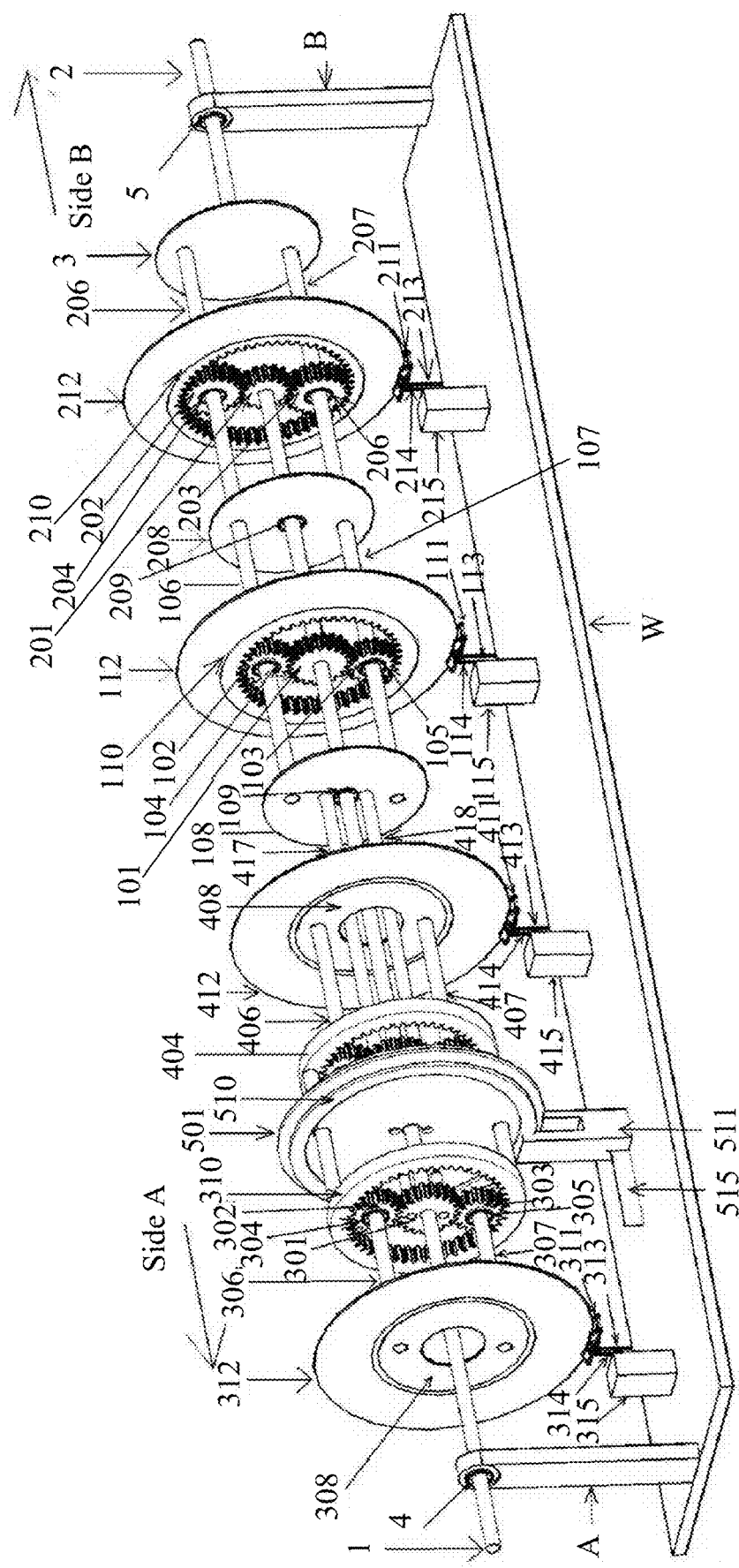
FIG. 8 shows a gearbox using planetary gear train units characterized with PGTU3 and a socket carrier arm mechanism.

FIG. 7 illustrates an alternate embodiment of the planetary gearbox. Referring to FIG. 7, it can be seen that the additional PGTU T3 is characterized with a socket plate between the gear train E1 and E2. The socket plate comprises pins 502 and 503 mounted on side B of the sun gear 301, a socket plate 501 with pin sockets 504 and 505, rod sockets 506 and 507 through which rods 309 and 409 pass, shaft socket 508 at the centre through which driving shaft 1 passes, guide rings 509 and 510 disposed at a distance from SCA on side A and B of the SCA 501 respectively wherein the guide rings 509 and 510 are supported by a guide ring holder 511 with its wing 512 and wing 513 fixed to the guide rings 509 and 510 respectively. The guide ring holder 511 comprises a track slot 514 at its bottom, a track 515 is fixed to a base W on which track slot 514 is placed.

When the guide ring holder 511 is pushed towards side A from side B along the track 515, the displacement of the guide ring holder 511 causes the guide ring 510 to push the SCA 501 in the same direction as that of the displacement of ring holder 511. Therefore, the SCA 501 moves towards the sun gear 301 and hence the pins 502 and 503 are inserted in the pin sockets 504 and 505 thereby engaging the sun gear 301 with the SCA. As a result, the motion of the sun gear 301 causes the rods 309 and 409 to revolve around the driving shaft 1 thereby causing the ring gears 310 and 410 to rotate in the same direction as that of the motion of the sun gear 301, same time On the other hand, the revolutionary motion of the planet gears 402 and 403 is arrested by applying brake 411 and the revolutionary motion of the planet gears 302 and 303 is set free which makes planet gears 402 and 403 to rotate in the direction of rotation of the sun gear 301 and further rotates the sun gear 401 in the direction opposite to the direction of rotation of the sun gear 301. Hence, transmission is carried out through PGTU T3 in a direction opposite to the direction of rotation of the driving shaft 1, when driving shaft 1 is rotating.

What is claimed is:

1. A planetary gearbox comprising:
   a driving shaft;
   a driving planetary gear train unit arranged on the driving shaft, wherein the driving planetary gear train unit comprises:
      a first sun gear mounted on the driving shaft;
      at least one first planet gear that is rotatably mounted on a first planet axle and meshed to the first sun gear;
      a first ring gear that is meshed to the first planet gear;
      at least one first circular planet carrier arm (CPCA) that is mechanically coupled to the first planet axle; and
      a first brake assembly coupled to the first circular planet carrier arm;
   a driven planetary gear train unit comprising:
      a second sun gear rotatably mounted on the driving shaft;
      at least one second planet gear that is rotatably mounted on a second planet axle and meshed to the second sun gear;
      a second ring gear that is meshed to the second planet gear;
      at least one second circular planet carrier arm (CPCA) that is mechanically coupled to the second planet axle; and
      a second brake assembly coupled to the second circular planet carrier arm;
      wherein the first ring gear of the driving planetary gear train unit is coupled to the second ring gear of the driven planetary gear train unit;
   a third planetary gear train unit comprising:
      a third sun gear mounted on the driving shaft;
      at least one third planet gear that is rotatably mounted on a third planet axle and meshed to the third sun gear;
      a third ring gear that is meshed to the third planet gear;
      at least one third circular planet carrier arm (CPCA) that is mechanically coupled to the third planet axle; and
      a third brake assembly coupled to the third ring gear;
   a fourth planetary gear train unit comprising:
      a fourth sun gear mounted on the driving shaft;
      at least one fourth planet gear that is rotatably mounted on a fourth planet axle and meshed to the fourth sun gear;
      a fourth ring gear that is meshed to the fourth planet gear;
      at least one fourth circular planet carrier arm (CPCA) that is mechanically coupled to the fourth planet axle; and
      a fourth brake assembly coupled to the fourth ring gear;
   a carrier arm disc; and
   a driven shaft
   wherein the second sun gear is mechanically coupled to the third CPCA, the third CPCA is mechanically coupled to the fourth CPCA, the fourth CPCA is mechanically coupled to the carrier arm disc and the carrier arm disc is mechanically coupled to the driven shaft.

2. The planetary gearbox as claimed in claim 1, wherein the planetary gearbox comprises:
   a first shaft support configured to support the driving shaft, wherein one end of the first shaft support is rigidly fixed to a base and another end of the first shaft support defines a hole within which a first bearing is disposed and the driving shaft traverses through the first bearing; and
   a second shaft support configured to support the driven shaft, wherein one end of the second shaft support is rigidly fixed to the base and another end of the second shaft support defines a hole within which a second bearing is disposed and the driven shaft traverses through the second bearing.

3. The planetary gearbox as claimed in claim 1, wherein the driven shaft rotates at the same speed as the driving shaft, when the brakes are not applied across the planetary gearbox.

4. The planetary gearbox as claimed in claim 1, wherein the rotational motion of the driving shaft is transmitted to the driven shaft having a load, by braking rotational motion of the first CPCA and the second CPCA and keeping rotational motion of the ring gears of the third planetary gear train unit and fourth planetary gear train unit unbraked.

5. The planetary gearbox as claimed in claim 1, wherein the planetary gearbox comprises a reverse gear mechanism comprising:
   a socket plate positioned between the driving planetary gear train unit and the driven planetary gear train unit;
   a first guide ring arranged on side A of the socket plate and a second guide ring arranged on side B of the socket plate;
   a shaft port defined at the center of the socket plate, wherein the driving shaft traverses through the shaft port;
   a first axle port and a second axle port defined on the socket plate, wherein the rods that couple the ring gears of the planetary gear train units traverse through the first axle port and second axle port;
   a pair of pins rigidly affixed to the side B of the first sun gear of the driving planetary gear train unit, wherein the pair of pins is configured to couple the first sun gear of the driving planetary gear train unit, with the socket plate;
   a pair of pin ports defined on the socket plate, wherein the pair of pin ports is configured to accommodate the pair of pins thereby coupling the sun gear of the driving planetary gear train unit, and the socket plate;
   a guide ring holder affixed on a base, the guide ring holder comprises:
      a first wing configured to support the first guide ring thereon at a first end of the guide ring holder;
      a second wing configured to support the second guide ring thereon at the first end of the guide ring holder;
      a slot at a second end of the guide ring holder; and
      a track rigidly affixed on the base and configured to slide through the slot.

6. The planetary gearbox as claimed in claim 5 wherein the rotation of the driving shaft is transmitted to the driven shaft, wherein the driven shaft rotates in a direction opposite to the direction of the driving shaft, when the pair of pins traverses into the pair of pin ports and the second CPCA is braked using the second brake assembly and, first CPCA, the third ring gear and the fourth ring gear are unbraked.

7. The planetary gearbox as claimed in claim 1, wherein the first ring gear of the driving planetary gear train unit and the second ring gear the driven planetary gear train unit are rigidly coupled via at least a pair of rods.

8. The planetary gearbox as claimed in claim 1, wherein the rotational motion of the driving shaft is transmitted, to the driven shaft having a load, by unbraking rotational motion of the first CPCA and the second CPCA and keeping rotational motion of the ring gears of the third planetary gear train unit or fourth planetary gear train unit braked.

* * * * *